(12) United States Patent
Chien et al.

(10) Patent No.: US 7,633,570 B2
(45) Date of Patent: Dec. 15, 2009

(54) LIQUID CRYSTAL DISPLAY WITH UNIFORM FEED-THROUGH VOLTAGE

(75) Inventors: Chih-Yuan Chien, Hsin-Chu (TW); Chien-Hua Chen, Hsin-Chu (TW); Chen-Kuo Yang, Hsin-Chu (TW); Hsuen-Ying Huang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 97 days.

(21) Appl. No.: 12/051,846

(22) Filed: Mar. 20, 2008

(65) Prior Publication Data

US 2009/0174831 A1 Jul. 9, 2009

(30) Foreign Application Priority Data

Jan. 3, 2008 (TW) .............................. 97100198 A

(51) Int. Cl.
*G02F 1/1343* (2006.01)
(52) U.S. Cl. .............................. 349/39; 349/19; 349/33; 349/38
(58) Field of Classification Search .................. 349/19, 349/33, 38, 39
See application file for complete search history.

(56) References Cited

U.S. PATENT DOCUMENTS

| 5,796,456 | A | 8/1998 | Takatori |
| 6,483,566 | B2 * | 11/2002 | Youn et al. .................. 349/141 |
| 7,250,992 | B2 | 7/2007 | Lai |
| 7,369,202 | B2 * | 5/2008 | Ahn et al. .................. 349/141 |

\* cited by examiner

*Primary Examiner*—Jennifer Doan
(74) *Attorney, Agent, or Firm*—Winston Hsu

(57) ABSTRACT

A liquid crystal display with uniform feed-through voltage includes a plurality of data lines for receiving a plurality of data signals respectively, a plurality of gate lines for receiving a plurality of gate signals respectively, a plurality of common lines for receiving a common voltage, a plurality of storage units, a plurality of first switches, and a plurality of second switches. Each storage unit includes a first liquid crystal capacitor and a second liquid crystal capacitor coupled to a corresponding common line. Each first switch is coupled to a corresponding data line, a corresponding gate line, and a corresponding first liquid crystal capacitor. Each second switch is coupled to a corresponding gate line, a corresponding first switch, and a corresponding second liquid crystal capacitor. The capacitance of the gate-source capacitor of each first switch is greater than the capacitance of the gate-source capacitor of each second switch.

24 Claims, 7 Drawing Sheets

LIQUID CRYSTAL DISPLAY WITH UNIFORM FEED-THROUGH VOLTAGE

BACKGROUND OF THE INVENTION

1. Field of the Invention

The present invention relates to a liquid crystal display, and more particularly, to a liquid crystal display with uniform feed-through voltage.

2. Description of the Prior Art

Because liquid crystal displays (LCDs) are characterized by thin appearance, low power consumption, and low radiation, LCDs have been widely applied in various electronic products such as computer monitors, mobile phones, personal digital assistants (PDAs), or flat panel televisions. In general, the LCD comprises a liquid crystal layer encapsulated by two substrates. The operation of an LCD is featured by varying voltage drops between opposite sides of different sections of the liquid crystal layer for twisting the angles of the liquid crystal molecules in different sections of the liquid crystal layer so that the transparency of different sections of the liquid crystal layer can be controlled accordingly for illustrating images.

It is well known that each pixel of an LCD can be designed to comprise two sub-pixels for achieving a wide viewing angle. That is, based on gray level averaging effect of two Gamma curves corresponding to the two sub-pixels, optimal visual experience can be realized in different viewing angles for having a high-quality wide viewing angle. However, in the data signal driving operation of the liquid crystal display, the event of different feed-through voltages will occur to the charging operation concerning the two sub-pixels. Accordingly, the phenomena of flickering and color-shift arise on the screen of the liquid crystal display. In order to solve the flickering and color-shift phenomena, two different common lines can be utilized to compensate different feed-through voltages occurring to the voltage drops of the liquid crystal capacitors of the two sub-pixels. Nevertheless, the prior-art technique for solving the flickering and color-shift phenomena is paid by the complicated design of driving modules and control circuits of the liquid crystal display, which in turn will significantly increase production cost. Furthermore, the event of different feed-through voltages will also reduce the available voltage range of each pixel of the liquid crystal display, and the available contrast range for brightness control of each pixel of the liquid crystal display is reduced accordingly.

SUMMARY OF THE INVENTION

In accordance with an embodiment of the present invention, a liquid crystal display with uniform feed-through voltage is disclosed. The liquid crystal display comprises a plurality of data lines, a plurality of gate lines, a plurality of common lines, a plurality of storage units, a plurality of first switches, and a plurality of second switches.

Each of the data lines is utilized to receive a corresponding data signal. The gate lines are crossed with the plurality of data lines perpendicularly. Each of the plurality of gate lines is utilized to receive a corresponding gate signal. The common lines are utilized to receive a common voltage. Each of the plurality of storage units comprises a first liquid crystal capacitor and a second liquid crystal capacitor. The first liquid crystal capacitor comprises a first end and a second end. The first end of the first liquid crystal capacitor is coupled to a corresponding common line of the plurality of common lines. The second liquid crystal capacitor comprises a first end and a second end. The first end of the second liquid crystal capacitor is coupled to the corresponding common line of the plurality of common lines. Each of the plurality of first switches comprises a first end, a second end, a gate, and a first end capacitor. The first end of the first switch is coupled to the second end of a corresponding first liquid crystal capacitor of the plurality of first liquid crystal capacitors. The second end of the first switch is coupled to a corresponding data line of the plurality of data lines. The gate of the first switch is coupled to a corresponding gate line of the plurality of gate lines. The signal connection between the first end and the second end of the first switch is controlled based on a gate signal furnished to the gate of the first switch via the corresponding gate line. The first end capacitor of the first switch is coupled between the gate and the first end of the first switch. Each of the plurality of second switches comprises a first end, a second end, a gate, and a first end capacitor. The first end of the second switch is coupled to the second end of a corresponding second liquid crystal capacitor of the plurality of second liquid crystal capacitors. The second end of the second switch is coupled to the first end of a corresponding first switch of the plurality of first switches. The gate of the second switch is coupled to a corresponding gate line of the plurality of gate lines. The signal connection between the first end and the second end of the second switch is controlled based on a gate signal furnished to the gate of the second switch via the corresponding gate line. The first end capacitor of the second switch is coupled between the gate and the first end of the second switch. The capacitance of the first end capacitor of the first switch is greater than the capacitance of the first end capacitor of the second switch.

In accordance with another embodiment of the present invention, a liquid crystal display with uniform feed-through voltage is disclosed. The liquid crystal display comprises a plurality of data lines, a plurality of gate lines, a plurality of first common lines, a plurality of second common lines, a plurality of storage units, a plurality of first switches, and a plurality of second switches.

Each of the plurality of data lines is utilized to receive a corresponding data signal. The plurality of gate lines are crossed with the plurality of data lines perpendicularly. Each of the plurality of gate lines is utilized to receive a corresponding gate signal. The first common lines are utilized to receive a first common voltage. The second common lines are utilized to receive a second common voltage. Each of the plurality of storage units comprises a first liquid crystal capacitor and a second liquid crystal capacitor. The first liquid crystal capacitor comprises a first end and a second end. The first end of the first liquid crystal capacitor is coupled to a corresponding first common line of the plurality of first common lines. The second liquid crystal capacitor comprises a first end and a second end. The first end of the second liquid crystal capacitor is coupled to the corresponding second common line of the plurality of second common lines. Each of the plurality of first switches comprises a first end, a second end, a gate, and a first end capacitor. The first end of the first switch is coupled to the second end of a corresponding first liquid crystal capacitor of the plurality of first liquid crystal capacitors. The second end of the first switch is coupled to a corresponding data line of the plurality of data lines. The gate of the first switch is coupled to a corresponding gate line of the plurality of gate lines. The signal connection between the first end and the second end of the first switch is controlled based on a gate signal furnished to the gate of the first switch via the corresponding gate line. The first end capacitor of the first switch is coupled between the gate and the first end of the first switch. Each of the plurality of second switches comprises a first end, a second end, a gate, and a first end capacitor. The first end of the second switch is coupled to the second end of a corresponding second liquid crystal capacitor of the plurality of second liquid crystal capacitors. The second end of the second switch is coupled to the first end of a corresponding first switch of the plurality of first switches. The gate of the second switch is coupled to a corresponding gate line of the plurality of gate lines. The signal connection between the first end and the second end of the second switch is controlled based on a gate signal furnished to the gate of the second switch via the corresponding gate line. The first end capacitor of the second switch is coupled between the gate and the first end of the second switch. The capacitance of the first end capacitor of the first switch is greater than the capacitance of the first end capacitor of the second switch.

In accordance with another embodiment of the present invention, a liquid crystal display with uniform feed-through voltage is disclosed. The liquid crystal display comprises a plurality of data lines, a plurality of gate lines, a plurality of common lines, a plurality of storage units, a plurality of first switches, and a plurality of second switches.

Each of the plurality of data lines is utilized to receive a corresponding data signal. The plurality of gate lines are crossed with the plurality of data lines perpendicularly. Each of the plurality of gate lines is utilized to receive a corresponding gate signal. The common lines are utilized to receive a common voltage. Each of the plurality of storage units comprises a first liquid crystal capacitor and a second liquid crystal capacitor. The first liquid crystal capacitor comprises a first end and a second end. The first end of the first liquid crystal capacitor is coupled to a corresponding common line of the plurality of common lines. The second liquid crystal capacitor comprises a first end and a second end. The first end of the second liquid crystal capacitor is coupled to the corresponding common line of the plurality of common lines. Each of the plurality of first switches comprises a first end, a second end, a gate channel, and a gate. The first end of the first switch is coupled to the second end of a corresponding first liquid crystal capacitor of the plurality of first liquid crystal capacitors. The second end of the first switch is coupled to a corresponding data line of the plurality of data lines. The gate channel of the first switch is coupled between the first end and the second end of the first transistor. The gate of the first switch is coupled to a corresponding gate line of the plurality of gate lines. The signal connection between the first end and the second end of the first switch is controlled based on a gate signal furnished to the gate of the first switch via the corresponding gate line. Each of the plurality of second switches comprises a first end, a second end, a gate, and a first end capacitor. The first end of the second switch is coupled to the second end of a corresponding second liquid crystal capacitor of the plurality of second liquid crystal capacitors. The second end of the second switch is coupled to the first end of a corresponding first switch of the plurality of first switches. The gate channel of the second switch is coupled between the first end and the second end of the second transistor. The gate of the second switch is coupled to a corresponding gate line of the plurality of gate lines. The signal connection between the first end and the second end of the second switch is controlled based on a gate signal furnished to the gate of the second switch via the corresponding gate line. The ratio of width to length of the gate channel of the first switch is greater than the ratio of width to length of the gate channel of the second switch.

In accordance with another embodiment of the present invention, a liquid crystal display with uniform feed-through voltage is disclosed. The liquid crystal display comprises a plurality of data lines, a plurality of gate lines, a plurality of first common lines, a plurality of second common lines, a plurality of storage units, a plurality of first switches, and a plurality of second switches.

Each of the plurality of data lines is utilized to receive a corresponding data signal. The plurality of gate lines are crossed with the plurality of data lines perpendicularly. Each of the plurality of gate lines is utilized to receive a corresponding gate signal. The first common lines are utilized to receive a first common voltage. The second common lines are utilized to receive a second common voltage. Each of the plurality of storage units comprises a first liquid crystal capacitor and a second liquid crystal capacitor. The first liquid crystal capacitor comprises a first end and a second end. The first end of the first liquid crystal capacitor is coupled to a corresponding common line of the plurality of common lines. The second liquid crystal capacitor comprises a first end and a second end. The first end of the second liquid crystal capacitor is coupled to the corresponding common line of the plurality of common lines. Each of the plurality of first switches comprises a first end, a second end, a gate channel, and a gate. The first end of the first switch is coupled to the second end of a corresponding first liquid crystal capacitor of the plurality of first liquid crystal capacitors. The second end of the first switch is coupled to a corresponding data line of the plurality of data lines. The gate channel of the first switch is coupled between the first end and the second end of the first transistor. The gate of the first switch is coupled to a corresponding gate line of the plurality of gate lines. The signal connection between the first end and the second end of the first switch is controlled based on a gate signal furnished to the gate of the first switch via the corresponding gate line. Each of the plurality of second switches comprises a first end, a second end, a gate, and a first end capacitor. The first end of the second switch is coupled to the second end of a corresponding second liquid crystal capacitor of the plurality of second liquid crystal capacitors. The second end of the second switch is coupled to the first end of a corresponding first switch of the plurality of first switches. The gate channel of the second switch is coupled between the first end and the second end of the second transistor. The gate of the second switch is coupled to a corresponding gate line of the plurality of gate lines. The signal connection between the first end and the second end of the second switch is controlled based on a gate signal furnished to the gate of the second switch via the corresponding gate line. The ratio of width to length of the gate channel of the first switch is greater than the ratio of width to length of the gate channel of the second switch.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
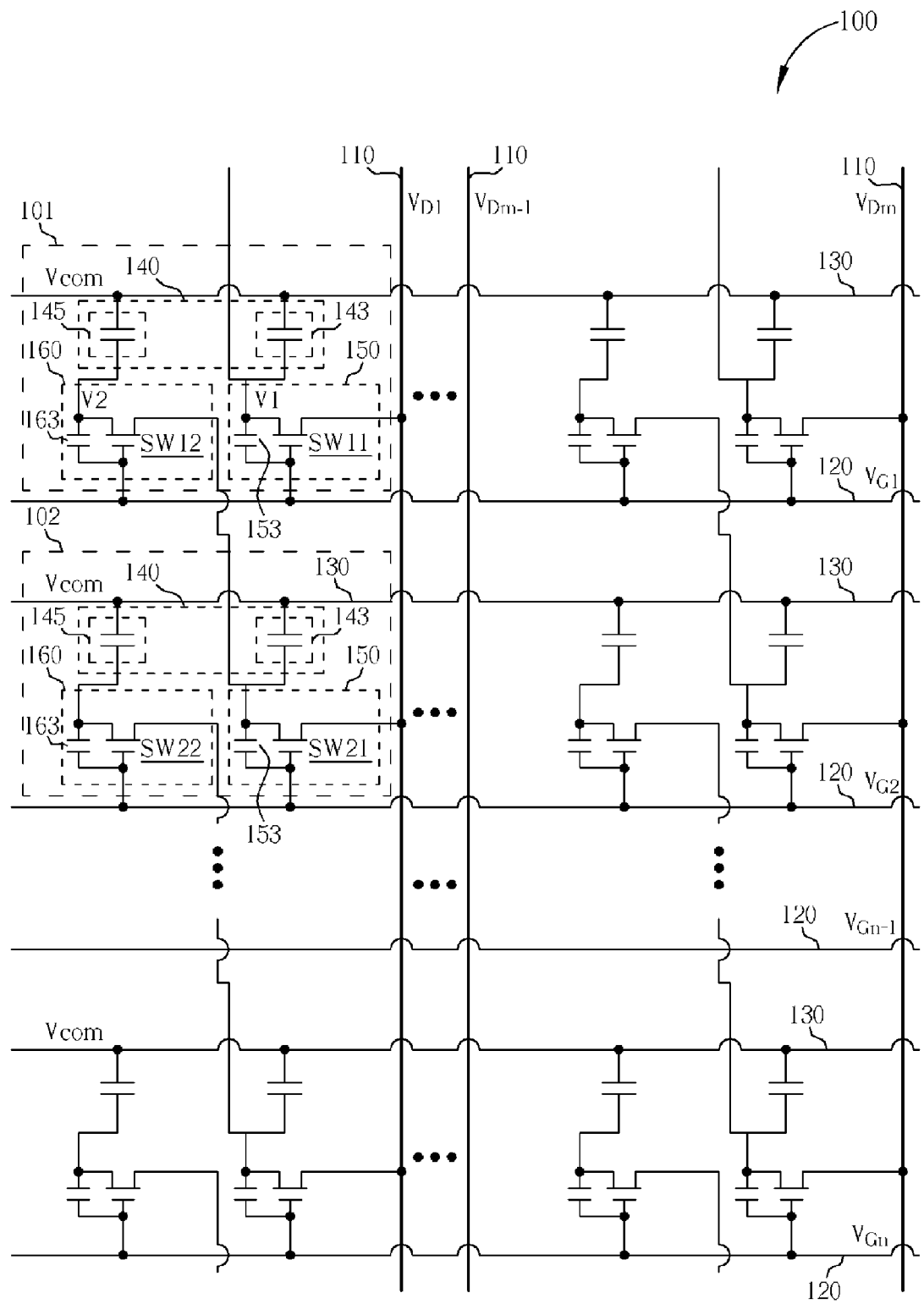
FIG. 1 is a circuit diagram schematically showing the structure of a liquid crystal display (only circuits related to charging/discharging control operation for sub-pixels are shown) in accordance with a first embodiment of the present invention.

FIG. 1 is a circuit diagram schematically showing the structure of a liquid crystal display 100 (only circuits related to charging control operation for sub-pixels are shown) in accordance with a first embodiment of the present invention. As shown in FIG. 1, the liquid crystal display 100 comprises a plurality of parallel data lines 110, a plurality of parallel gate lines 120, a plurality of parallel common lines 130, a plurality of storage units 140, a plurality of first switches 150, and a plurality of second switches 160. Each pixel area of the liquid crystal display 100 is sectioned by adjacent data lines 110 and adjacent gate lines 120. Each pixel area comprises a corresponding storage unit 140, a corresponding first switch 150, and a corresponding second switch 160.

The data lines 110 are utilized to receive corresponding data signals $V_{D1}$-$V_{Dm}$ respectively. The plurality of gate lines 120 are crossed with the plurality of data lines 110 perpendicularly and are utilized to receive corresponding gate signals $V_{G1}$-$V_{Gn}$ respectively. The common lines 130 are parallel to the plurality of gate lines 120. Each of the plurality of common lines 130 is utilized to receive a common voltage Vcom. Each storage unit 140 is corresponding to a pixel. Each pixel comprises a first sub-pixel and a second sub-pixel. The first sub-pixel comprises a first liquid crystal capacitor 143 having a first capacitance $C_B$, which is also termed as a bright capacitance. The second sub-pixel comprises a second liquid crystal capacitor 145 having a second capacitance $C_D$, which is also termed as a dark capacitance. Each first liquid crystal capacitor 143 comprises a first end and a second end. The first end of the first liquid crystal capacitor 143 is coupled to a corresponding common line 130. Each second liquid crystal capacitor 145 comprises a first end and a second end. The first end of the second liquid crystal capacitor 145 is coupled to a corresponding common line 130.

Each first switch 150 comprises a first end, a second end, a gate, a first end capacitor 153, and a gate channel. The first end of a first switch 150 is coupled to the second end of a corresponding first liquid crystal capacitor 143. The second end of a first switch 150 is coupled to a corresponding data line 110. The gate of a first switch 150 is coupled to a corresponding gate line 120. The first end capacitor 153 of a first switch 150 is coupled between the gate and the first end of the first switch 150. The gate channel of a first switch 150 is coupled between the first end and the second end of the first switch 150. Each first switch 150 controls a signal connection between the first end and the second end of the first switch 150 based on a gate signal furnished to the gate of the first switch 150 via the corresponding gate line 120. The first switches 150 comprise thin film transistors or metal oxide semiconductor (MOS) field effect transistors. That is, for example, the first end of a first switch 150 can be a source, the second end of the first switch 150 can be a drain, and the first end capacitor 153 of the first switch 150 can be a gate-source capacitor having a capacitance Cgs1. The gate channel of a first switch 150 has a width measured along a direction perpendicular to the drain-source current flowing direction of the first switch 150. Furthermore, the gate channel of a first switch 150 has a length measured along a direction parallel to the drain-source current flowing direction of the first switch 150.

Each second switch 160 comprises a first end, a second end, a gate, a first end capacitor 163, and a gate channel. The first end of a second switch 160 is coupled to the second end of a corresponding second liquid crystal capacitor 145. The second end of a second switch 160 is coupled to the first end of the first transistor 150 of an adjacent pixel area. The gate of a second switch 160 is coupled to a corresponding gate line 120. The first end capacitor 163 of a second switch 160 is coupled between the gate and the first end of the second switch 160. The gate channel of a second switch 160 is coupled between the first end and the second end of the second switch 160. Each second switch 160 controls a signal connection between the first end and the second end of the second switch 160 based on a gate signal furnished to the gate of the second switch 160 via the corresponding gate line 120. The second switches 160 comprise thin film transistors or MOS field effect transistors. That is, the first end of a second switch 160 can be a source, the second end of the second switch 160 can be a drain, and the first end capacitor 163 of the second switch 160 can be a gate-source capacitor having a capacitance Cgs2. The gate channel of a second switch 160 has a width measured along a direction perpendicular to the drain-source current flowing direction of the second switch 160. Furthermore, the gate channel of a second switch 160 has a length measured along a direction parallel to the drain-source current flowing direction of the second switch 160.

Figure 2:
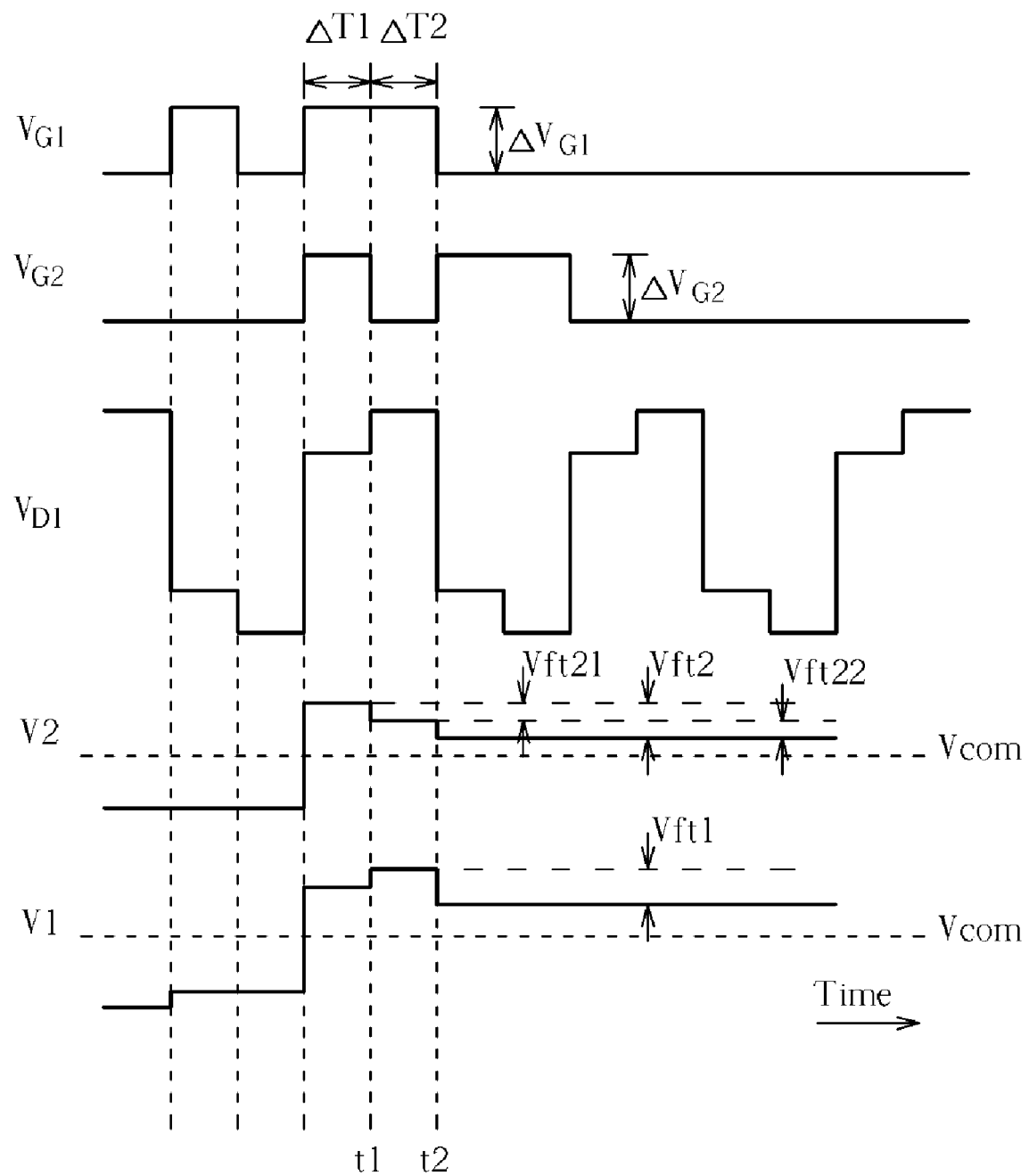
FIG. 2 shows the related signal waveforms concerning the operation of the liquid crystal display in FIG. 1, having time along the abscissa.

FIG. 2 shows the related signal waveforms concerning the operation of the liquid crystal display 100 in FIG. 1, having time along the abscissa. For the sake of elucidation, only the related signal waveforms for the charging/discharging operation concerning a first pixel area 101 and a second pixel area 102 of the liquid crystal display 100 based on two gate signals $V_{G1}$, $V_{G2}$ and one data signal $V_{D1}$ are shown in FIG. 2. As shown in FIG. 1, the first switch 150 of the first pixel area 101 is also labeled as a switch SW11, the second switch 160 of the first pixel area 101 is also labeled as a switch SW12, the first switch 150 of the second pixel area 102 is also labeled as a switch SW21, and the second switch 160 of the second pixel area 102 is also labeled as a switch SW22. The voltage at the second end of the first liquid crystal capacitor 143 of the first pixel area 101 is labeled as a first voltage V1. The voltage at the second end of the second liquid crystal capacitor 145 of the first pixel area 101 is labeled as a second voltage V2.

The signal waveforms in FIG. 2, from top to bottom, are the gate signal $V_{G1}$, the gate signal $V_{G2}$, the data signal $V_{D1}$, the second voltage V2, and the first voltage V1. When the gate signal $V_{G2}$ is changing from a high voltage level to a low voltage level at time t1, the state of the switch SW21 is switched from an on-state to an off-state. Since the gate signal $V_{G1}$ retains a high voltage level at time t1, both the states of the switches SW11 and SW12 continue on-states. Accordingly, the second voltage V2 shifts down a feed-through voltage Vft21 shown in FIG. 2 due to turning off the switch SW21 together with the level-shifting of the gate signal $V_{G2}$. The feed-through voltage Vft21 can be expressed according to the Formula (1) listed below.

$$Vft21 = \frac{Cgs1}{C_D + C_B + Cgs1} \Delta V_{G2} \quad \text{Formula (1)}$$

In Formula (1), Cgs1 represents the capacitance of the first end capacitor 153 of the switch SW21, $C_D$ represents the capacitance of the second liquid crystal capacitor 145 of the first pixel area 101, $C_B$ represents the capacitance of the first liquid crystal capacitor 143 of the second pixel area 102, and $\Delta V_{G2}$ represents the voltage difference between the high voltage level and the low voltage level of the gate signal $V_{G2}$.

When the gate signal $V_{G1}$ is changing from a high voltage level to a low voltage level at time t2, both the states of the switches SW11 and SW12 are switched from on-states to off-states. Accordingly, the second voltage V2 shifts down a feed-through voltage Vft22 shown in FIG. 2 due to turning off the switch SW12 together with the level-shifting of the gate signal $V_{G1}$. Besides, the first voltage V1 shifts down a feed-through voltage Vft1 shown in FIG. 2 due to turning off the switch SW11 together with the level-shifting of the gate signal $V_{G1}$. The feed-through voltages Vft22 and Vft1 can be expressed according to the Formulas (2) and (3) listed below.

$$Vft22 = \frac{Cgs2}{C_D + Cgs2} \Delta V_{G1} \quad \text{Formula (2)}$$

$$Vft1 = \frac{Cgs1}{C_B + Cgs1} \Delta V_{G1} \quad \text{Formula (3)}$$

In Formulas (2) and (3), Cgs2 represents the capacitance of the first end capacitor 163 of the switch SW12, Cgs1 represents the capacitance of the first end capacitor 153 of the switch SW11, $C_D$ represents the capacitance of the second liquid crystal capacitor 145 of the first pixel area 101, $C_B$ represents the capacitance of the first liquid crystal capacitor 143 of the first pixel area 101, and $\Delta V_{G1}$ represents the voltage difference between the high voltage level and the low voltage level of the gate signal $V_{G1}$.

Accordingly, based on the signal waveforms shown in FIG. 2, after the changes of the gate signals $V_{G2}$ and $V_{G1}$ from the high voltage level to the low voltage level at times t1 and t2 respectively, the first voltage V1 of the first liquid crystal capacitor 143 of the first pixel area 101 shifts down the feed-through voltage Vft1, and the second voltage V2 of the second liquid crystal capacitor 145 of the first pixel area 101 shifts down a feed-through voltage Vft2. The feed-through voltage Vft2 is a sum of the feed-through voltage Vft21 and the feed-through voltage Vft22. In the data signal driving operation of a prior-art liquid crystal display, the flickering and color-shift phenomena will occur due to significant discrepancy between the feed-through voltages Vft1 and Vft2. In general, the feed-through voltage Vft2 is greater than the feed-through voltage Vft1. Besides, the discrepancy between the feed-through voltages Vft1 and Vft2 will also reduce available contrast range for brightness control of each pixel.

For that reason, in one preferred embodiment, the capacitance Cgs1 can be adjusted according to the Formula (4) listed below so that the feed-through voltages Vft1 and Vft2 are substantially equal for eliminating the color-shift phenomenon.

$$\frac{Cgs1}{C_D + C_B + Cgs1} + \frac{Cgs2}{C_D + Vgs2} = \frac{Cgs1}{C_B + Cgs1} \quad \text{Formula (4)}$$

The voltage differences $\Delta V_{G1}$ and $\Delta V_{G2}$ are not shown in Formula (4) because the voltage differences $\Delta V_{G1}$ and $\Delta V_{G2}$ are normally equal and thus can be taken out. That is, through adjusting the capacitance Cgs1 based on the capacitances $C_D$, $C_B$, and Cgs2 according to Formula (4), the feed-through voltage Vft1 can be set to equal the feed-through voltage Vft2. In other words, through adjusting the capacitance Cgs1 of the first end capacitor 153 of the first switch 150, the liquid crystal display having uniform feed-through voltage can be implemented. In general, the adjusted capacitance Cgs1 is greater than the capacitance Cgs2. Furthermore, in order to diminish the flickering phenomenon, the common voltage Vcom shown in FIG. 2 can be set to change in response to the feed-through voltage shift of the first voltage V1 or the second voltage V2.

Figure 3:
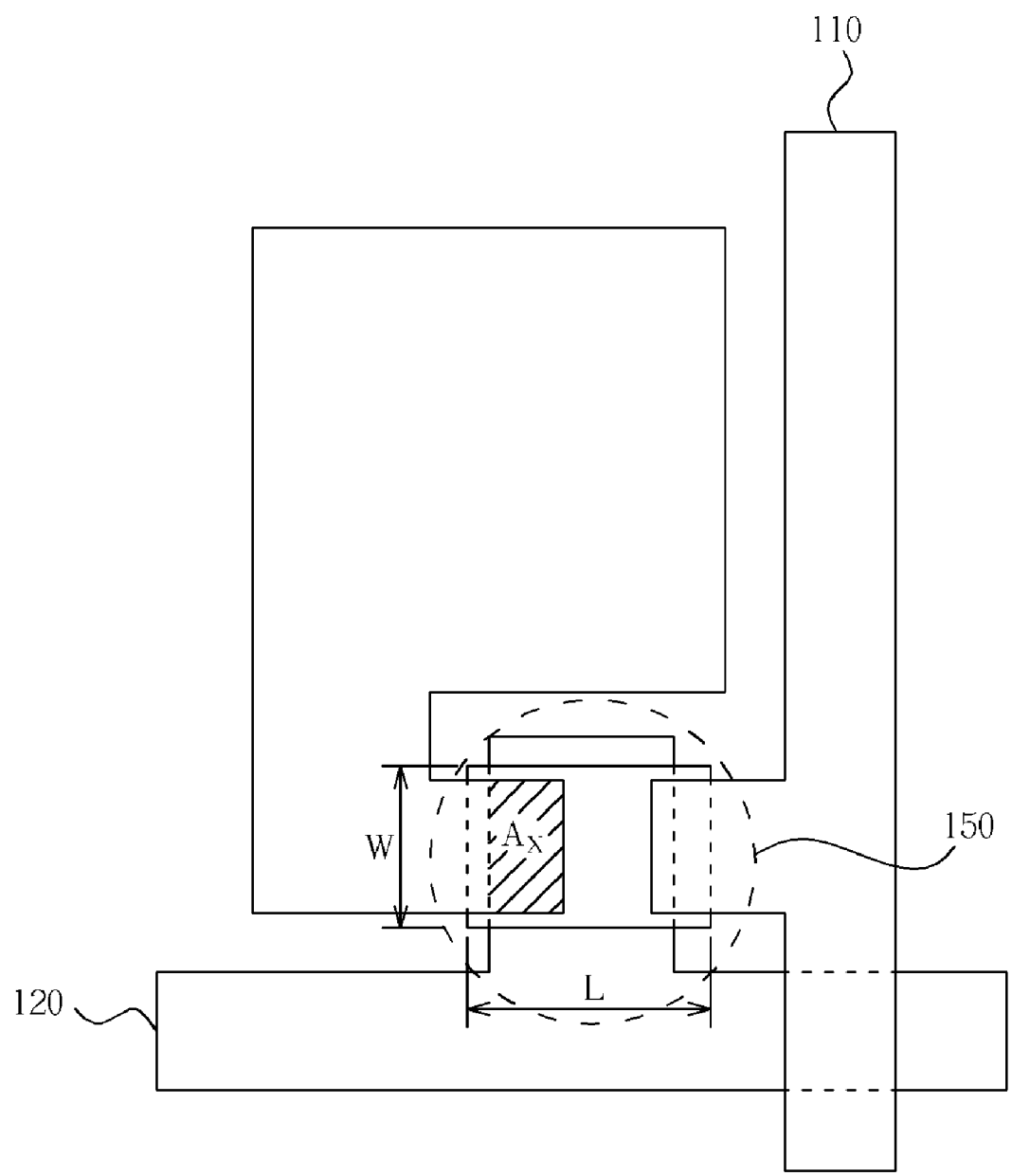
FIG. 3 is a diagram schematically showing a layout of the first switch shown in FIG. 1.

FIG. 3 is a diagram schematically showing a layout of the first switch 150 shown in FIG. 1. As shown in FIG. 3, the capacitor area Ax of the first end capacitor 153 of the first switch 150 is indicated by a single-hatched region. Therefore, the required capacitance Cgs1 of the first end capacitor 153 can be designed by sizing the capacitor area Ax. Besides, by adjusting the thickness or dielectric constant of the insulation layer of the first end capacitor 153, the required capacitance Cgs1 of the first end capacitor 153 can also be designed.

Based on the above description, the capacitance Cgs1 being adjusted should be greater than the capacitance Cgs2. Accordingly, in one embodiment, the capacitor area of the first end capacitor 153 of the first switch 150 can be adjusted to be greater than the capacitor area of the first end capacitor 163 of the second switch 160 so that the required capacitance Cgs1 of the first end capacitor 153 can be achieved. In another embodiment, the thickness of the insulation layer of the first end capacitor 153 of the first switch 150 can be adjusted to be thinner than the thickness of the insulation layer of the first end capacitor 163 of the first switch 160 so that the required capacitance Cgs1 of the first end capacitor 153 can be achieved. In the other embodiment, the dielectric constant of the insulation layer of the first end capacitor 153 of the first switch 150 can be adjusted to be greater than the dielectric constant of the insulation layer of the first end capacitor 163 of the first switch 160 so that the required capacitance Cgs1 of the first end capacitor 153 can be achieved. Alternatively, the required capacitance Cgs1 of the first end capacitor 153 can also be achieved by adjusting at least two parameters of the capacitor area, the thickness and the dielectric constant of the insulation layer of the first end capacitor 153.

It is well known that the capacitance ratio $C_D/C_B$ of the capacitance $C_D$ of the second liquid crystal capacitor 145 to the capacitance $C_B$ of the first liquid crystal capacitor 143 affects the available viewing angle of the liquid crystal display 100. In general, the range of the available viewing angle can be wider as the capacitance ratio $C_D/C_B$ is greater. However, as the capacitance ratio $C_D/C_B$ is greater, the ratio of the charging period $\Delta T1$ to the charging period $\Delta T2$, as shown in FIG. 2, is normally adjusted to be greater. In one embodiment, as the capacitance ratio $C_D/C_B$ is set to be a ratio of 2 to 1, the ratio of the charging period $\Delta T1$ to the charging period $\Delta T2$ is set to be a ratio of 3 to 1. However, as the charging period $\Delta T2$ shrinks, the color-shift phenomenon caused by deficient color saturation will occur due to lower charging ratio of the first liquid crystal capacitor 143. In order to boost the charging ratio of the first liquid crystal capacitor 143, the ratio of the width W to the length L of the gate channel of the first switch 150, as shown in FIG. 3, can be designed to have a higher value, and meanwhile, the capacitance Cgs1 of the first end capacitor 153 can also be adjusted to have the desirable value.

Figure 4:
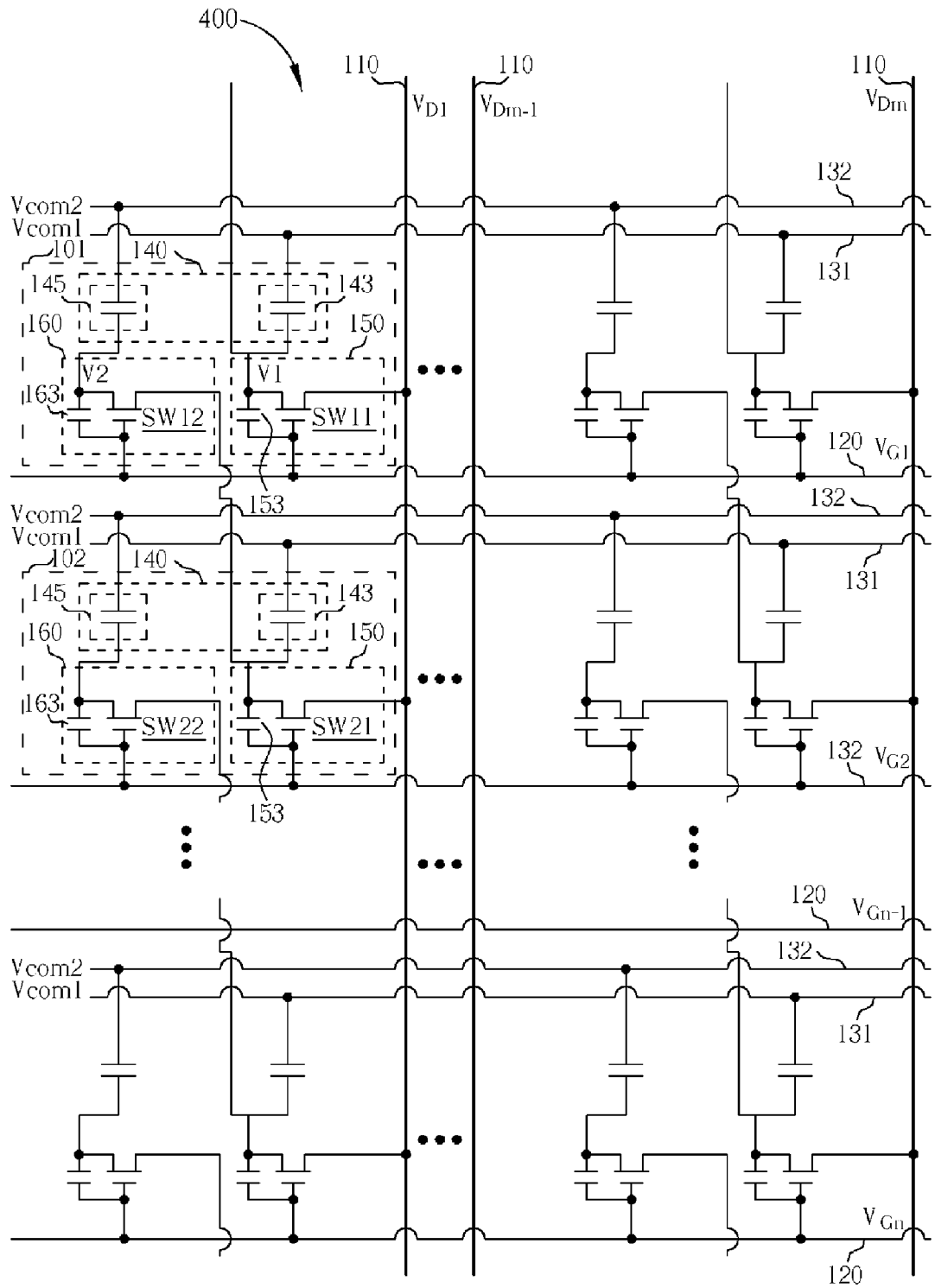
FIG. 4 is a circuit diagram schematically showing the structure of a liquid crystal display in accordance with a second embodiment of the present invention.

FIG. 4 is a circuit diagram schematically showing the structure of a liquid crystal display 400 in accordance with a second embodiment of the present invention. As shown in FIG. 4, the circuit structure of the liquid crystal display 400 is similar to the circuit structure of the liquid crystal display 100 shown in FIG. 1, differing only in that the plurality of parallel common lines 130 are replaced with a plurality of parallel first common lines 131 and a plurality of parallel second common lines 132. All the pluralities of first common lines 131 and second common lines 132 are parallel to the plurality of gate lines 120. Each of the plurality of first common lines 131 is utilized to receive a first common voltage Vcom1, and each of the plurality of second common lines 132 is utilized to receive a second common voltage Vcom2. The first end of each first liquid crystal capacitor 143 is coupled to a corresponding first common line 131. The first end of each second liquid crystal capacitor 145 is coupled to a corresponding second common line 132. The other circuits of the liquid crystal display 400 are identical to the circuits of the liquid crystal display 100, and for the sake of brevity, further discussion on the other circuits of liquid crystal display 400 is omitted.

Figure 5:
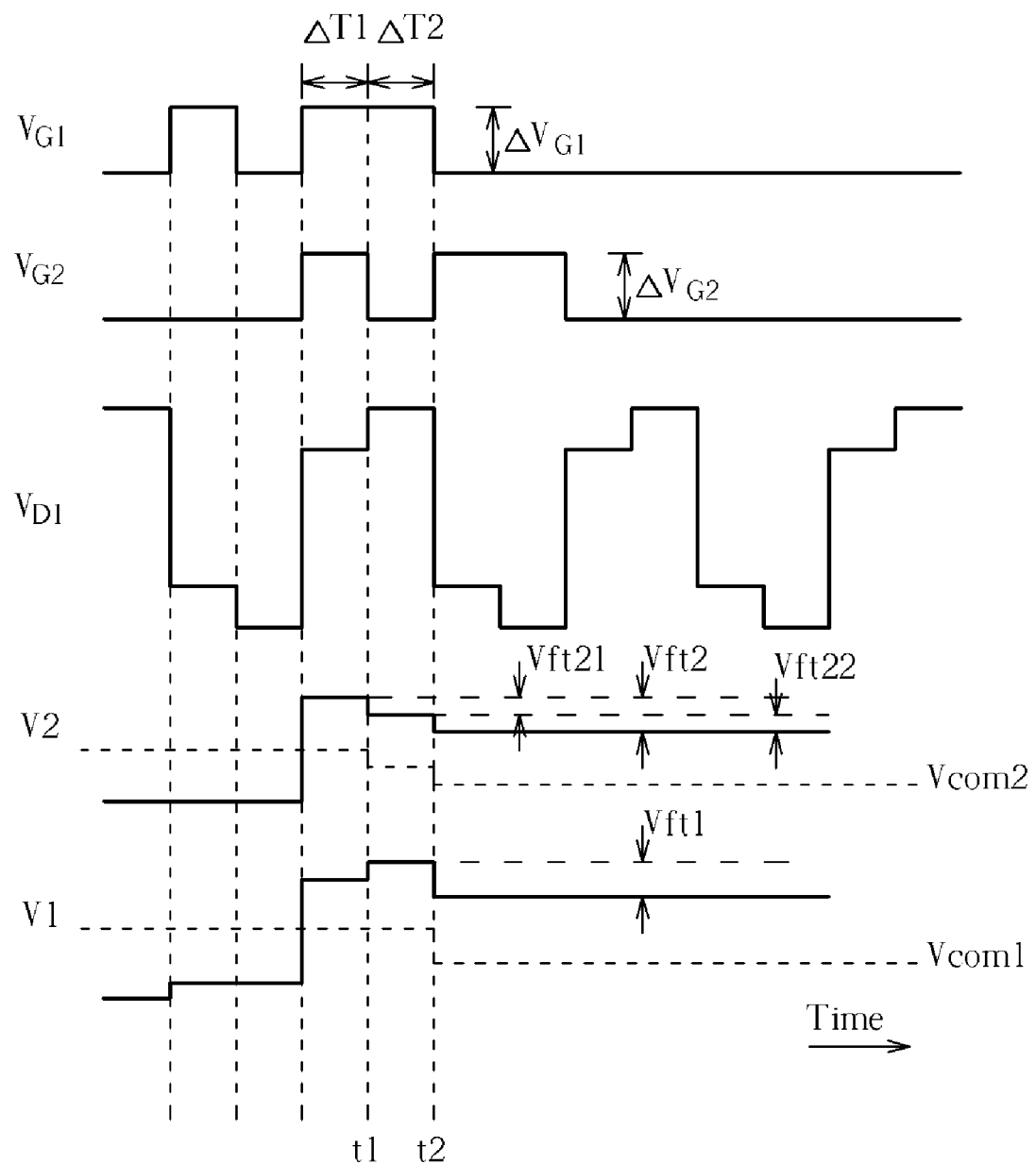
FIG. 5 shows the related signal waveforms concerning the operation of the liquid crystal display in FIG. 4, having time along the abscissa.

FIG. 5 shows the related signal waveforms concerning the operation of the liquid crystal display 400 in FIG. 4, having time along the abscissa. For the sake of elucidation, only the related signal waveforms for the charging/discharging operation concerning a first pixel area 101 and a second pixel area 102 of the liquid crystal display 400 based on two gate signals $V_{G1}$, $V_{G2}$ and one data signal $V_{D1}$ are shown in FIG. 5. It is obvious that the signal waveforms of the gate signal $V_{G1}$, the gate signal $V_{G2}$, the data signal $V_{D1}$, the second voltage V2, and the first voltage V1 shown in FIG. 5 are identical to those shown in FIG. 2. Accordingly, the corresponding relationships concerning the feed-through voltages Vft21, Vft22, and Vft1 can also be expressed as the Formulas (1), (2), and (3). In one preferred embodiment, the capacitance Cgs1 can be also adjusted according to the Formula (4) so that the feed-through voltages Vft1 and Vft2 are substantially equal for eliminating the color-shift phenomenon. However, the common voltage Vcom in FIG. 2 is replaced with a first common voltage Vcom1 and a second common voltage Vcom2 in FIG. 5. Moreover, in order to get rid of the flickering phenomenon, the first common voltage Vcom1 shown in FIG. 5 is set to change in response to the feed-through voltage shift of the first voltage V1, and the second common voltage Vcom2 shown in FIG. 5 is set to change in response to the feed-through voltage shift of the second voltage V2.

In summary, the liquid crystal display 400 is able to eliminate the color-shift phenomenon based on a design having required capacitance Cgs1. Furthermore, the liquid crystal display 400 is also able to get rid of the flickering phenomenon through providing the first common voltage Vcom1 and the second common voltage Vcom2 individually changing in response to the feed-through voltage shifts of the first voltage V1 and the second voltage V2 respectively to each first common line 131 and each second common line 132. Moreover, the circuit designed for providing the first common voltage Vcom1 and the second common voltage Vcom2 can be simplified due to identical feed-through voltages Vft1 and Vft2. In addition, because of the uniform feed-through voltage in the operation of the liquid crystal display 400, the reduction of available contrast range for brightness control of each pixel of the liquid crystal display 400 is not as serious as that of the prior-art liquid crystal display. Similarly, as the capacitance ratio $C_D/C_B$ is increased, the color-shift phenomenon caused by deficient color saturation due to reduction of the charging period ΔT2 can be compensated by devising the first switch 150 with the gate channel having a greater width/length ratio.

Figure 6:
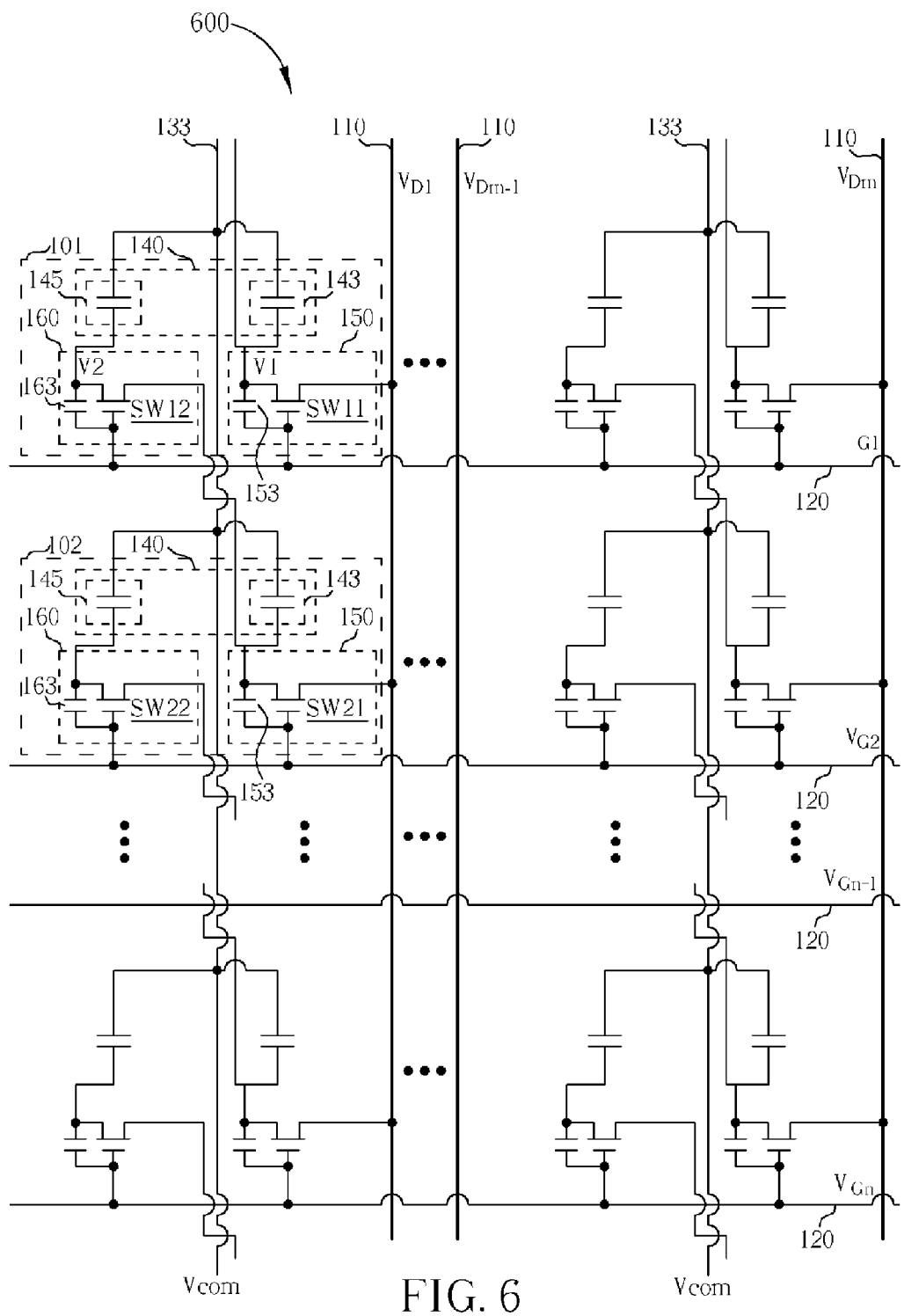
FIG. 6 is a circuit diagram schematically showing the structure of a liquid crystal display in accordance with a third embodiment of the present invention.

FIG. 6 is a circuit diagram schematically showing the structure of a liquid crystal display 600 in accordance with a third embodiment of the present invention. As shown in FIG. 6, the circuit structure of the liquid crystal display 600 is similar to the circuit structure of the liquid crystal display 100 shown in FIG. 1, differing only in that the plurality of parallel common lines 130 are replaced with a plurality of parallel common lines 133. The common lines 133 are perpendicular to the plurality of gate lines 120. Each of the plurality of common lines 133 receives a common voltage Vcom. The first ends of the first liquid crystal capacitor 143 and the second liquid crystal capacitor 145 of each pixel are both coupled to a corresponding common line 133. The other circuits of the liquid crystal display 600 are identical to the circuits of the liquid crystal display 100, and for the sake of brevity, further discussion on the other circuits of liquid crystal display 600 is omitted.

Figure 7:
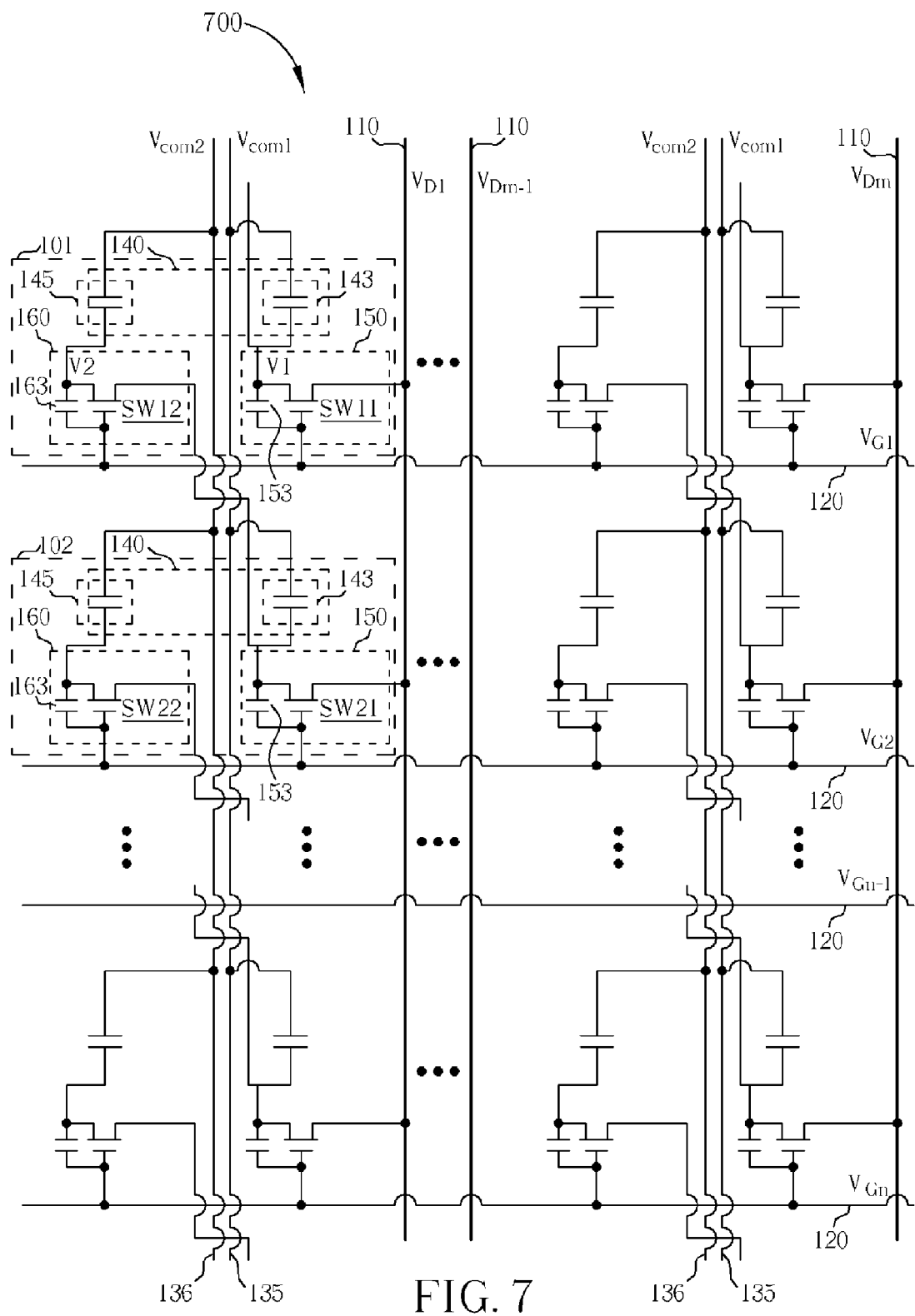
FIG. 7 is a circuit diagram schematically showing the structure of a liquid crystal display in accordance with a fourth embodiment of the present invention.

FIG. 7 is a circuit diagram schematically showing the structure of a liquid crystal display 700 in accordance with a fourth embodiment of the present invention. As shown in FIG. 7, the circuit structure of the liquid crystal display 700 is similar to the circuit structure of the liquid crystal display 400 shown in FIG. 4, differing only in that the plurality of parallel first common lines 131 and the plurality of parallel second common lines 132 are replaced with a plurality of parallel first common lines 135 and a plurality of parallel second common lines 136. All the pluralities of first common lines 135 and second common lines 136 are perpendicular to the plurality of gate lines 120. Each of the plurality of first common lines 135 receives a first common voltage Vcom1, and each of the plurality of second common lines 136 receives a second common voltage Vcom2. The first end of each first liquid crystal capacitor 143 is coupled to a corresponding first common line 135. The first end of each second liquid crystal capacitor 145 is coupled to a corresponding second common line 136. The other circuits of the liquid crystal display 700 are identical to the circuits of the liquid crystal display 400, and for the sake of brevity, further discussion on the other circuits of liquid crystal display 700 is omitted.

To sum up, the liquid crystal display of the present invention is able to operate with uniform feed-through voltage based on a design having required gate-source capacitances of corresponding transistor switches so as to eliminate the color-shift phenomenon. Furthermore, the liquid crystal display of the present invention is also able to get rid of the flickering phenomenon through providing a common voltage changing in response to the feed-through voltage shift of the voltage drop between opposite sides of the liquid crystal layer. Moreover, because of the uniform feed-through voltage in the operation of the liquid crystal display of the present invention, the reduction of available contrast range for brightness control of each pixel of the liquid crystal display of the present invention is not as serious as that of the prior-art liquid crystal display due to the minor reduction of available voltage range of each pixel of the liquid crystal display of the present invention. In addition, as the capacitance ratio $C_D/C_B$ of the liquid crystal display of the present invention is designed to have a higher value, the color-shift phenomenon caused by deficient color saturation due to adjustment of different charging periods can be compensated by devising the corresponding transistor switches with the gate channel having a greater width/length ratio so as to achieve a higher charging ratio of corresponding capacitors having bright capacitance.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display comprising:
    a plurality of data lines, each of the plurality of data lines being adapted to receive a corresponding data signal;
    a plurality of gate lines crossed with the plurality of data lines perpendicularly, each of the plurality of gate lines being adapted to receive a corresponding gate signal;
    a plurality of common lines for receiving a common voltage;
    a plurality of storage units, each of the plurality of storage units comprising:
        a first liquid crystal capacitor comprising a first end coupled to a corresponding common line of the plurality of common lines, and a second end; and
        a second liquid crystal capacitor comprising a first end coupled to the corresponding common line of the plurality of common lines, and a second end;
    a plurality of first switches, each of the plurality of first switches comprising:
        a first end coupled to the second end of a corresponding first liquid crystal capacitor of the plurality of first liquid crystal capacitors;
        a second end coupled to a corresponding data line of the plurality of data lines;
        a gate coupled to a corresponding gate line of the plurality of gate lines, wherein the first switch controls a signal connection between the first end and the second end of the first switch based on a gate signal furnished to the gate of the first switch via the corresponding gate line; and
        a first end capacitor coupled between the gate and the first end of the first switch; and
    a plurality of second switches, each of the plurality of second switches comprising:
        a first end coupled to the second end of a corresponding second liquid crystal capacitor of the plurality of second liquid crystal capacitors;
        a second end coupled to the first end of a corresponding first switch of the plurality of first switches;
        a gate coupled to a corresponding gate line of the plurality of gate lines, wherein the second switch controls a signal connection between the first end and the second end of the second switch based on a gate signal furnished to the gate of the second switch via the corresponding gate line; and
        a first end capacitor coupled between the gate and the first end of the second switch;
    wherein a capacitance of the first end capacitor of the first switch is greater than a capacitance of the first end capacitor of the second switch.

2. The liquid crystal display of claim 1, wherein the capacitance of the first end capacitor of the first switch is devised according to the following formula:

$$\frac{Cgs1}{C_D + C_B + Cgs1} + \frac{Cgs2}{C_D + Vgs2} = \frac{Cgs1}{C_B + Cgs1};$$

where Cgs1 represents the capacitance of the first end capacitor of the first switch, Cgs2 represents the capacitance of the first end capacitor of the second switch, $C_B$ represents a capacitance of the first liquid crystal capacitor, and $C_D$ represents a capacitance of the second liquid crystal capacitor.

3. The liquid crystal display of claim 1, wherein the first end capacitor of the first switch has a capacitor area which is greater than the capacitor area of the first end capacitor of the second switch.

4. The liquid crystal display of claim 1, wherein the first end capacitor of the first switch comprises an insulation layer, the first end capacitor of the second switch comprises an insulation layer, and a thickness of the insulation layer of the first end capacitor of the first switch is less than a thickness of the insulation layer of the first end capacitor of the second switch.

5. The liquid crystal display of claim 1, wherein the first end capacitor of the first switch comprises an insulation layer, the first end capacitor of the second switch comprises an insulation layer, and a dielectric constant of the insulation layer of the first end capacitor of the first switch is greater than a dielectric constant of the insulation layer of the first end capacitor of the second switch.

6. The liquid crystal display of claim 1, wherein the plurality of first switches and the plurality of second switches comprise thin film transistors or MOS field effect transistors.

7. The liquid crystal display of claim 1, wherein the plurality of common lines are parallel or perpendicular to the plurality of gate lines.

8. A liquid crystal display comprising:
    a plurality of data lines, each of the plurality of data lines being adapted to receive a corresponding data signal;
    a plurality of gate lines crossed with the plurality of data lines perpendicularly, each of the plurality of gate lines being adapted to receive a corresponding gate signal;
    a plurality of first common lines for receiving a first common voltage;
    a plurality of second common lines for receiving a second common voltage;
    a plurality of storage units, each of the plurality of storage units comprising:
        a first liquid crystal capacitor comprising a first end coupled to a corresponding first common line of the plurality of first common lines, and a second end; and
        a second liquid crystal capacitor comprising a first end coupled to a corresponding second common line of the plurality of second common lines, and a second end;
    a plurality of first switches, each of the plurality of first switches comprising:
        a first end coupled to the second end of a corresponding first liquid crystal capacitor of the plurality of first liquid crystal capacitors;
        a second end coupled to a corresponding data line of the plurality of data lines;
        a gate coupled to a corresponding gate line of the plurality of gate lines, wherein the first switch controls a signal connection between the first end and the second end of the first switch based on a gate signal furnished to the gate of the first switch via the corresponding gate line; and a first end capacitor coupled between the gate and the first end of the first switch; and a plurality of second switches, each of the plurality of second switches comprising:

a first end coupled to the second end of a corresponding second liquid crystal capacitor of the plurality of second liquid crystal capacitors;

a second end coupled to the first end of a corresponding first switch of the plurality of first switches;

a gate coupled to a corresponding gate line of the plurality of gate lines, wherein the second switch controls a signal connection between the first end and the second end of the second switch based on a gate signal furnished to the gate of the second switch via the corresponding gate line; and a first end capacitor coupled between the gate and the first end of the second switch;

wherein a capacitance of the first end capacitor of the first switch is greater than a capacitance of the first end capacitor of the second switch.

9. The liquid crystal display of claim 8, wherein the plurality of first common lines and the plurality of second common lines are substantially parallel or perpendicular to the plurality of gate lines.

10. The liquid crystal display of claim 8, wherein the capacitance of the first end capacitor of the first switch is devised according to the following formula:

$$\frac{Cgs1}{C_D + C_B + Cgs1} + \frac{Cgs2}{C_D + Vgs2} = \frac{Cgs1}{C_B + Cgs1};$$

where Cgs1 represents the capacitance of the first end capacitor of the first switch, Cgs2 represents the capacitance of the first end capacitor of the second switch, $C_B$ represents a capacitance of the first liquid crystal capacitor, and $C_D$ represents a capacitance of the second liquid crystal capacitor.

11. The liquid crystal display of claim 8, wherein the first end capacitor of the first switch has a capacitor area which is greater than the capacitor area of the first end capacitor of the second switch.

12. The liquid crystal display of claim 8, wherein the first end capacitor of the first switch comprises an insulation layer, the first end capacitor of the second switch comprises an insulation layer, and a thickness of the insulation layer of the first end capacitor of the first switch is less than a thickness of the insulation layer of the first end capacitor of the second switch.

13. The liquid crystal display of claim 8, wherein the first end capacitor of the first switch comprises an insulation layer, the first end capacitor of the second switch comprises an insulation layer, and a dielectric constant of the insulation layer of the first end capacitor of the first switch is greater than a dielectric constant of the insulation layer of the first end capacitor of the second switch.

14. The liquid crystal display of claim 8, wherein the plurality of first switches and the plurality of second switches comprise thin film transistors or MOS field effect transistors.

15. A liquid crystal display comprising:

a plurality of data lines, each of the plurality of data lines being adapted to receive a corresponding data signal;

a plurality of gate lines crossed with the plurality of data lines perpendicularly, each of the plurality of gate lines being adapted to receive a corresponding gate signal;

a plurality of common lines for receiving a common voltage, the plurality of parallel common lines being substantially parallel or perpendicular to the plurality of gate lines;

a plurality of storage units, each of the plurality of storage units comprising:

a first liquid crystal capacitor comprising a first end coupled to a corresponding common line of the plurality of common lines, and a second end; and a second liquid crystal capacitor comprising a first end coupled to the corresponding common line of the plurality of common lines, and a second end;

a plurality of first switches, each of the plurality of first switches comprising:

a first end coupled to the second end of a corresponding first liquid crystal capacitor of the plurality of first liquid crystal capacitors;

a second end coupled to a corresponding data line of the plurality of data lines;

a gate channel coupled between the first end and the second end of the first transistor; and a gate coupled to a corresponding gate line of the plurality of gate lines, wherein the first switch controls a signal connection between the first end and the second end of the first switch based on a gate signal furnished to the gate of the first switch via the corresponding gate line; and a plurality of second switches, each of the plurality of second switches comprising:

a first end coupled to the second end of a corresponding second liquid crystal capacitor of the plurality of second liquid crystal capacitors;

a second end coupled to the first end of a corresponding first switch of the plurality of first switches;

a gate channel coupled between the first end and the second end of the second transistor; and a gate coupled to a corresponding gate line of the plurality of gate lines, wherein the second switch controls a signal connection between the first end and the second end of the second switch based on a gate signal furnished to the gate of the second switch via the corresponding gate line;

wherein a ratio of width to length of the gate channel of the first switch is greater than a ratio of width to length of the gate channel of the second switch.

16. The liquid crystal display of claim 15, wherein the first switch further comprises a first end capacitor coupled between the gate and the first end of the first switch; and the second switch further comprises a first end capacitor coupled between the gate and the first end of the second switch; wherein a capacitance of the first end capacitor of the first switch is greater than a capacitance of the first end capacitor of the second switch.

17. The liquid crystal display of claim 16, wherein the capacitance of the first end capacitor of the first switch is devised according to the following formula:

$$\frac{Cgs1}{C_D + C_B + Cgs1} + \frac{Cgs2}{C_D + Vgs2} = \frac{Cgs1}{C_B + Cgs1};$$

where Cgs1 represents the capacitance of the first end capacitor of the first switch, Cgs2 represents the capacitance of the first end capacitor of the second switch, $C_B$ represents a capacitance of the first liquid crystal capacitor, and $C_D$ represents a capacitance of the second liquid crystal capacitor.

18. The liquid crystal display of claim 16, wherein the first end capacitor of the first switch has a capacitor area which is greater than the capacitor area of the first end capacitor of the second switch.

19. The liquid crystal display of claim 16, wherein the first end capacitor of the first switch comprises an insulation layer, the first end capacitor of the second switch comprises an insulation layer; a thickness of the insulation layer of the first end capacitor of the first switch is less than a thickness of the insulation layer of the first end capacitor of the second switch; and a dielectric constant of the insulation layer of the first end capacitor of the first switch is greater than a dielectric constant of the insulation layer of the first end capacitor of the second switch.

20. A liquid crystal display comprising:
a plurality of data lines, each of the plurality of data lines being adapted to receive a corresponding data signal;
a plurality of gate lines crossed with the plurality of data lines perpendicularly, each of the plurality of gate lines being adapted to receive a corresponding gate signal;
a plurality of first common lines for receiving a first common voltage;
a plurality of second common lines for receiving a second common voltage;
a plurality of storage units, each of the plurality of storage units comprising:
 a first liquid crystal capacitor comprising a first end coupled to a corresponding first common line of the plurality of first common lines, and a second end; and
 a second liquid crystal capacitor comprising a first end coupled to a corresponding second common line of the plurality of second common lines, and a second end;
a plurality of first switches, each of the plurality of first switches comprising:
 a first end coupled to the second end of a corresponding first liquid crystal capacitor of the plurality of first liquid crystal capacitors;
 a second end coupled to a corresponding data line of the plurality of data lines;
 a gate channel coupled between the first end and the second end of the first transistor; and
 a gate coupled to a corresponding gate line of the plurality of gate lines, wherein the first switch controls a signal connection between the first end and the second end of the first switch based on a gate signal furnished to the gate of the first switch via the corresponding gate line; and
a plurality of second switches, each of the plurality of second switches comprising:
 a first end coupled to the second end of a corresponding second liquid crystal capacitor of the plurality of second liquid crystal capacitors;
 a second end coupled to the first end of a corresponding first switch of the plurality of first switches;
 a gate channel coupled between the first end and the second end of the second transistor; and
 a gate coupled to a corresponding gate line of the plurality of gate lines, wherein the second switch controls a signal connection between the first end and the second end of the second switch based on a gate signal furnished to the gate of the second switch via the corresponding gate line;
wherein a ratio of width to length of the gate channel of the first switch is greater than a ratio of width to length of the gate channel of the second switch.

21. The liquid crystal display of claim 20, wherein the first switch further comprises a first end capacitor coupled between the gate and the first end of the first switch; and the second switch further comprises a first end capacitor coupled between the gate and the first end of the second switch; wherein a capacitance of the first end capacitor of the first switch is greater than a capacitance of the first end capacitor of the second switch.

22. The liquid crystal display of claim 21, wherein the capacitance of the first end capacitor of the first switch is devised according to the following formula:

$$\frac{Cgs1}{C_D + C_B + Cgs1} + \frac{Cgs2}{C_D + Vgs2} = \frac{Cgs1}{C_B + Cgs1};$$

where Cgs1 represents the capacitance of the first end capacitor of the first switch, Cgs2 represents the capacitance of the first end capacitor of the second switch, $C_B$ represents a capacitance of the first liquid crystal capacitor, and $C_D$ represents a capacitance of the second liquid crystal capacitor.

23. The liquid crystal display of claim 21, wherein the first end capacitor of the first switch has a capacitor area which is greater than the capacitor area of the first end capacitor of the second switch.

24. The liquid crystal display of claim 21, wherein the first end capacitor of the first switch comprises an insulation layer, the first end capacitor of the second switch comprises an insulation layer; a thickness of the insulation layer of the first end capacitor of the first switch is less than a thickness of the insulation layer of the first end capacitor of the second switch; and a dielectric constant of the insulation layer of the first end capacitor of the first switch is greater than a dielectric constant of the insulation layer of the first end capacitor of the second switch.

* * * * *